United States Patent
Malik et al.

(10) Patent No.: US 10,311,233 B2
(45) Date of Patent: *Jun. 4, 2019

(54) GENERIC UNPACKING OF PROGRAM BINARIES

(71) Applicant: MCAFEE, INC., Santa Clara, CA (US)

(72) Inventors: Amit Malik, Bangalore (IN); Vikas Taneja, Bangalore (IN); Benjamin Cruz, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/038,413

(22) PCT Filed: Dec. 23, 2014

(86) PCT No.: PCT/US2014/072158
§ 371 (c)(1),
(2) Date: May 20, 2016

(87) PCT Pub. No.: WO2015/100327
PCT Pub. Date: Jul. 2, 2015

(65) Prior Publication Data
US 2016/0292417 A1   Oct. 6, 2016

(30) Foreign Application Priority Data
Dec. 26, 2013  (IN) ............................ 6102/CHE/2013

(51) Int. Cl.
*G06F 11/00* (2006.01)
*G06F 21/56* (2013.01)
*G06F 21/57* (2013.01)
(52) U.S. Cl.
CPC .......... *G06F 21/562* (2013.01); *G06F 21/566* (2013.01); *G06F 21/577* (2013.01); *G06F 2221/034* (2013.01)

(58) Field of Classification Search
CPC .... G06F 21/562; G06F 21/577; G06F 21/566; G06F 2221/034
(Continued)

(56) References Cited

U.S. PATENT DOCUMENTS 6,823,460 B1 * 11/2004 Hollander ............. G06F 9/4425
                                                           710/260
7,996,904 B1    8/2011 Chiueh et al.
(Continued)

FOREIGN PATENT DOCUMENTS

CN    102402449 A    4/2012
JP    04233057       8/1992
(Continued)

OTHER PUBLICATIONS

Furtado, G., (2013), "Unpacking Framework for Packed Malicious Executables", Faculdade de Engenharia da Univrsidade Do Porto, Chapters 3 and 4.
(Continued)

*Primary Examiner* — Mohammad W Reza
(74) *Attorney, Agent, or Firm* — Hanley, Flight & Zimmerman, LLC

(57) ABSTRACT

By hooking application programming interfaces in an execution environment, the return address for hooked application programming interface calls can be logged and used to determine when a packed binary has been unpacked. In one approach, memory allocations are detected and the return address is checked against the memory regions allocated. In another approach, the contents of memory at the return address in a pre-execution copy of the executable binary is compared with the contents of memory at the return address in the executing copy of the binary. This allows efficient detection of the completion of unpacking without knowledge of the unpacking technique. The unpacked binary may then be analyzed for possible malware.

19 Claims, 8 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2003/0115479 | A1 | 6/2003 | Edwards et al. |
| 2005/0091512 | A1 | 4/2005 | Shipp |
| 2005/0172337 | A1 | 8/2005 | Bodorin et al. |
| 2007/0006300 | A1 | 1/2007 | Zamir et al. |
| 2007/0074026 | A1 | 3/2007 | Hicks |
| 2008/0148226 | A1* | 6/2008 | Chen ................ G06F 21/52 717/109 |
| 2008/0263659 | A1 | 10/2008 | Alme |
| 2010/0011441 | A1* | 1/2010 | Christodorescu ....... G06F 21/53 726/24 |
| 2011/0258163 | A1 | 10/2011 | Volkoff et al. |
| 2012/0090031 | A1 | 4/2012 | Fossen et al. |
| 2014/0096148 | A1* | 4/2014 | Yakovenko ............ G06F 9/544 719/330 |
| 2014/0283058 | A1 | 9/2014 | Gupta |

FOREIGN PATENT DOCUMENTS

| | | |
|---|---|---|
| JP | 2012194814 | 10/2012 |
| JP | 2013131157 | 7/2013 |
| KR | 10-2010-0073126 A | 7/2007 |

OTHER PUBLICATIONS

Guo, F., et al., (2008), "A Study of the Packer Problem and Its Solutions", Recent Advances in Intrusion Detection, pp. 98-115.

Roundy, K. A., et al., (2013), "Binary-code obfuscations in prevalent packer tools", ACM Computing Surveys, vol. 46, No. 1, pp. 1-32.

Extended Search Report dated Jun. 19, 2017.

Martignoni, et al., "OmniUnpack: Fast, Generic, and Safe Unpacking of Malware", IEEE 23rd Annual Computer Security Applications Conference, 2007, pp. 431-440.

Roundy et al., "Binary-Code Obfuscations in Prevalent Packer Tools," ACM Computing Surveys, vol. 46, No. 1, Article 4, Publication date: Oct. 2013, 34 pages.

Chinese Patent Office, "Office action," issued in connection with Chinese Application No. 201480064590.2, dated Jul. 30, 2018, 10 pages.

Royal et al., "PolyUnpack: Automating the Hidden-Code Extraction of Unpack-Executing Malware," 2006 22nd Annual Computer Security Applications Conference (ACSAC'06), Dec. 26, 2006, 10 pages.

Kang et al., "Renovo: A Hidden Code Extractor for Packed Executables," In Proceedings of the 5th ACM Workshop on Recurring Malcode (WORM), Nov. 2, 2007, 8 pages.

Patent Cooperation Treaty, "International Preliminary Report on Patentability," issued in connection with International Application No. PCT/US2014/072158, dated Jun. 28, 2016, 6 pages.

\* cited by examiner

GENERIC UNPACKING OF PROGRAM BINARIES

TECHNICAL FIELD

Embodiments described herein generally relate to malware detection, and in particular, to techniques for unpacking packed program binaries without knowledge of the packing technique used to create the packed program binary.

BACKGROUND ART

Contemporary delivery of application code typically involves its compression through a packing process. By using a packing process, binary file sizes may be reduced, and multiple files may be combined into one file. Modern packing processes create "self-extracting executables," which may be executed to unpack the contents of the packed code. That is, the packed code itself is accompanied by an executable code section or stub that, when executed, results in inflating or uncompressing the packed code. Accordingly, running a self-extracting executable can result in the packed code executable being expanded on disk, in memory, or both.

When packing a file to create a self-extracting executable, many different types of compression algorithms and packing techniques may be employed. Some of these are well-known and documented while others are not. Employing different techniques on the same file to create a self-extracting executable will result in different files—both the packing code and the packed code may be different because of different packers and varying results from different compression algorithms. Further, if unknown or undocumented techniques are used to pack the file into a self-extracting executable, it may be difficult to even determine the distinction between the packing code and the packed code.

These characteristics of self-extracting executables are often exploited by malware developers to hide malware from antivirus programs or malware detection programs. One common method to detect malware is signature scanning. With signature scanning, files are scanned for bit patterns, or signatures, that are known or suspected to be associated with malware. When a bit pattern in a file matches a signature of known malware, then that file can be identified as being, or containing, malware. However, a signature of a malicious executable can be easily changed in an effort to obfuscate the executable. When malware is packed, detection may be avoided because the known signature of the unpacked malware will not match any bit pattern of the packed malware file.

To attempt to overcome these efforts to hide malware, antivirus programs and malware detection programs may employ multiple techniques. One technique is to extract the packed code in memory without executing it and then attempt to scan the uncompressed binary for malware signatures. Packed code may be extracted by emulating its execution or, if the packing algorithm is known, performing the extraction by the antivirus program. If the packing technique is not well-known or documented, extracting the packed code under the control of the antivirus program may not be possible. Also, many packing algorithms use anti-emulation and anti-debugging techniques to simply terminate the unpacking process after detecting that the unpacking is being performed by a debugger or through emulation. Time stamping parts of the code flow is a standard method that may be used to determine that code is being emulated. Similarly, identifying that code is being debugged may be easily determined by inquiring to the operating system.

Even if the self-extracting executable is allowed to execute or be emulated, an antivirus program may have difficulty in determining when the unpacking part of execution is complete and when the originally compressed executable begins execution. In a self-extracting executable, the unpacking code and the packed executable are part of the same binary, and determining the distinction between the two in memory can be difficult.

Another technique to overcome the efforts to hide malware is to add signatures of known self-extracting executables which contain malware into an antivirus signature database once such a new signature of packed malware is identified. A weakness to this technique is that it may be easily avoided by slightly altering the packer code or the packing technique, resulting in a different self-extracting executable, and thus a different signature. Adding signatures accounting for these variations in packing techniques to the antivirus signature database serves to increase the size of the signature database. This causes a problem in that the number of signatures and the difficulty of maintaining of signature files can correspondingly increase. Further, these efforts may be further thwarted because the packing process can be repeated any number of times using different packing algorithms in different orders, creating an even greater number of signatures to identify and maintain.

Because unpacking of the binary can be crucial for malware detection, malware clustering and classification, automated analysis and automated reverse engineering, anti-malware software developers have tried various approaches to generic unpacking of malware, including PolyUnpack, Renovo, and OmniUnpack, however previous heuristic approaches have limitations on the types of packing that can be unpacked, require considerable computational resources, and have high false positive rates. PolyUnpack and Renovo are based on variants of fine grained analysis, which is a very slow and weak approach against the latest custom packers, while Omniunpack has a complex implementation and produces very high false positive rates if used in raw form. Better generic unpacking approaches would be helpful.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device.

Figure 1:
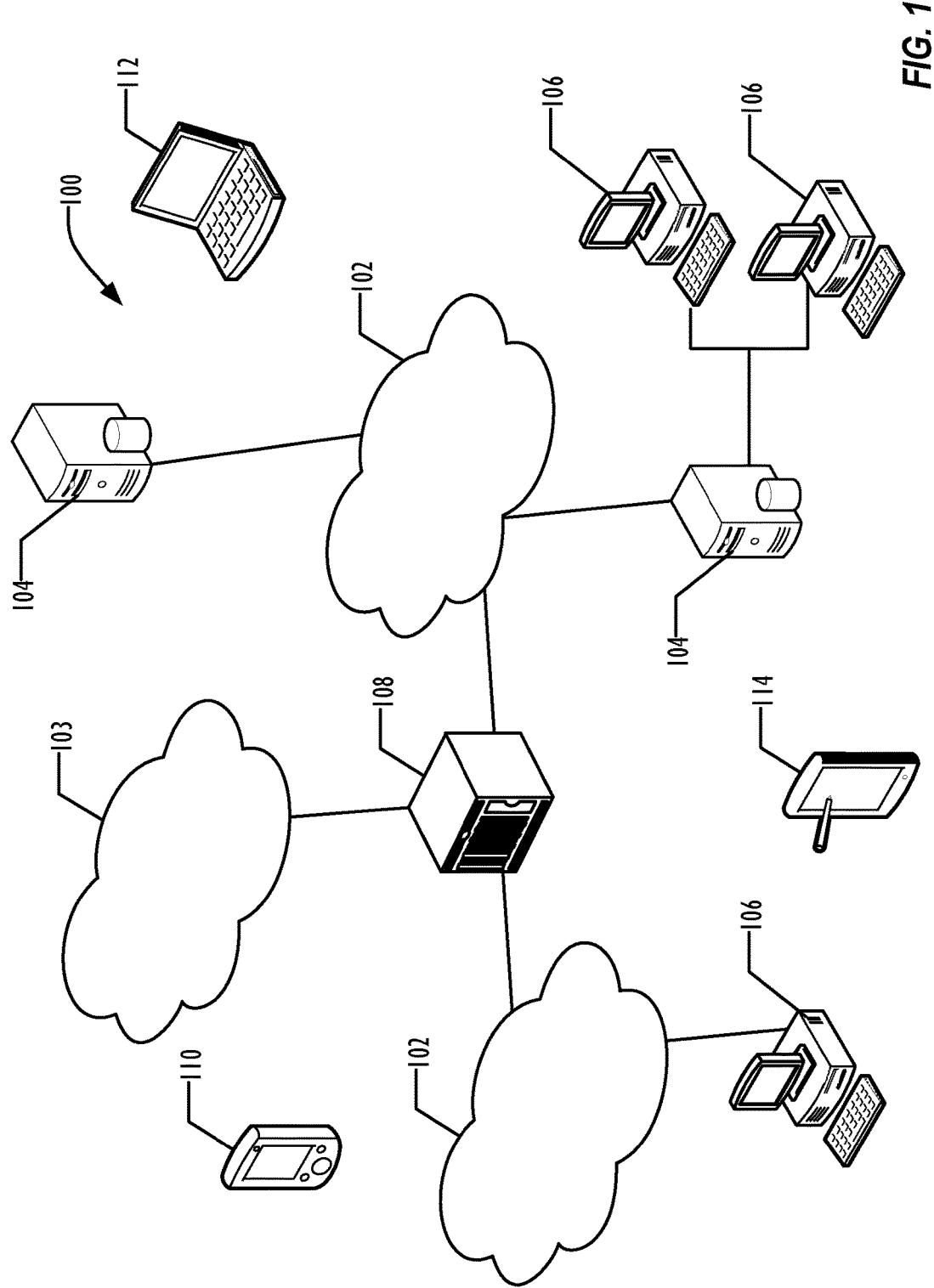
FIG. 1 is a block diagram illustrating an infrastructure in which the disclosed techniques may be implemented according to one embodiment.

Referring now to FIG. 1, an example infrastructure 100 in which the techniques described below may be implemented is illustrated schematically Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of devices. Mobile devices in the infrastructure 100 are illustrated as mobile phones 110, laptops 112, and tablets 114.

The heuristics described below take the advantage of CALL instruction. According to CALL instruction specifications, the CALL instruction transfers the execution to the target address and also saves the address of next instruction on the stack. That address is also known as the return address. The return address may be used to know the state of the code at run time. Techniques described below hook the Application Programming Interface (API) calls in the binary to get the return address and then use two heuristics to identify the unpacked code at run time.

Figure 2:
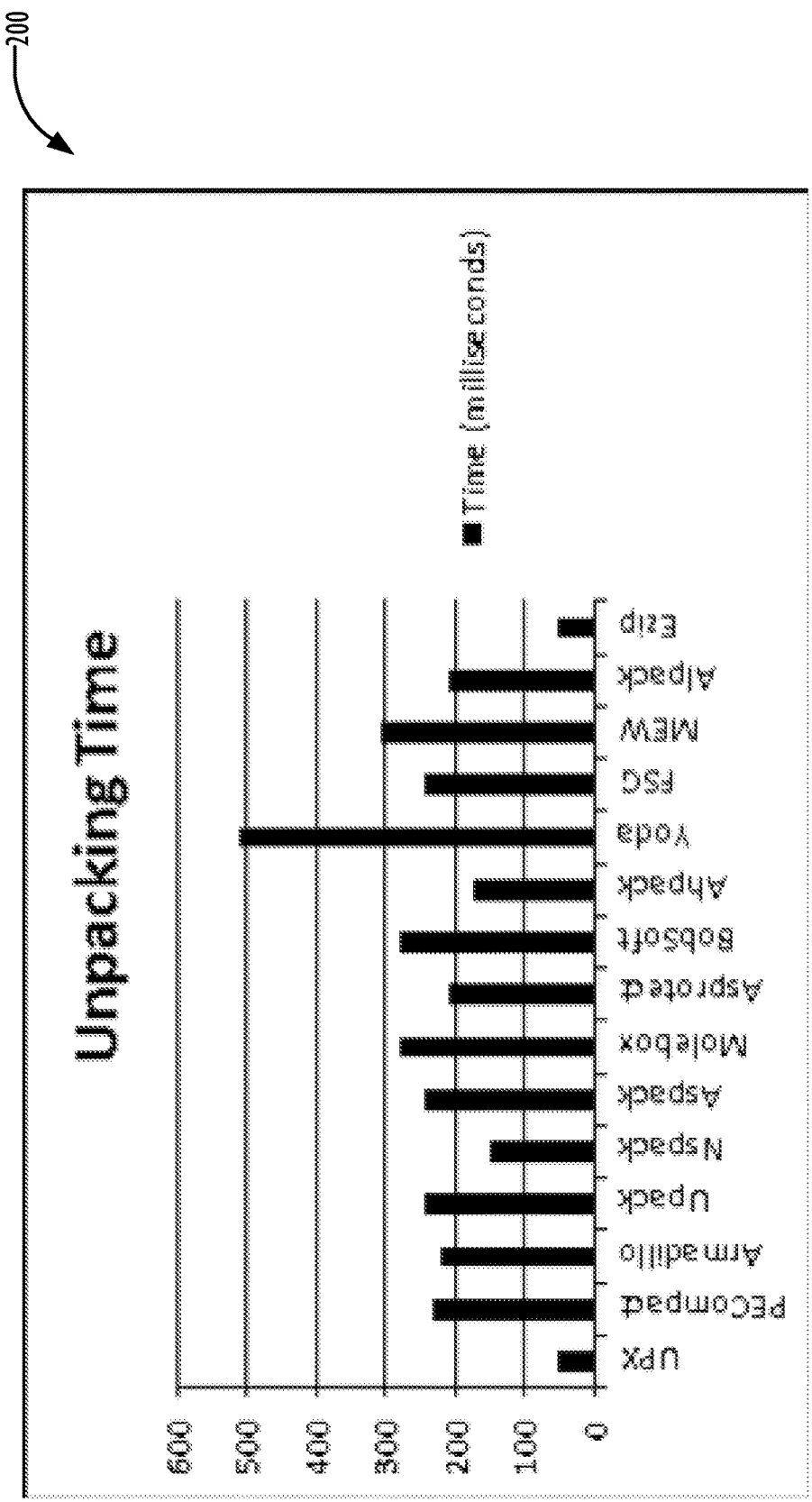
FIG. 2 is a graph illustrating example unpacking times for various known packers according to one embodiment.

The API calls serve as a basic mechanism to detect unpacked code in a binary that contains an unpacking stub and a packed executable. Thus, the time required to unpack the binary is directly proportional to the distribution of API calls in the unpacking stub, which is a self-extracting executable. In testing, our heuristics are much faster than previously proposed solutions because we just execute 30-40 more instructions per API call, thus much of the overhead of conventional techniques is eliminated. Another advantage of our heuristics is that the results are more accurate results because every binary will call APIs. In our experimental results we found that our heuristics were able to unpack known and unknown packers packed samples in less than 700 milliseconds completely. FIG. 2 is a chart illustrating times taken by our heuristic to unpack a binary packed with various known packers. This time includes the execution time of the unpacker itself as well as the execution time of the code used to implement our heuristic techniques. Unpacking the packed binary may involve multiple levels of unpacking, each potentially using a different unpacker. The heuristic techniques described below do not change the way in which the unpacker embedded in the binary operates, or depend upon any knowledge of the specific unpacker. Rather, they allow us to detect when unpacking has completed, so that the malware detection analysis can safely begin on the unpacked code.

The first heuristic technique monitors new memory allocations. This heuristic makes a table for all memory allocations, storing a start and an end address of each allocation. After that we scan every API return address with the previously populated table of allocations. If the return address is in a table entry, then we are executing unpacked code.

The second heuristic technique is binary mapping. This heuristic maps the binary in memory (the "passive binary image") and execute the same binary (the "active binary image"). From active binary image we fetch the return address for API calls and match the bytes at the return address with the bytes at the same address in the passive binary image. If the bytes are different, then we are executing unpacked code.

Both heuristics for unpacking the malware are based on coarse-grained API calls. We hook the APIs in order to unpack the binaries. Although the API calls described below are memory allocation APIs, the type of APIs to hook can be configurable, and not a constraint. For example, in real time detection system embodiments, the APIs may be limited to a specific set of APIs of interest. In automated malware analysis system embodiments, for another example, all system related APIs (registry, file system, process, and network) may be hooked. In another example, all APIs of kernel32.dll are hooked. Any desired set of APIs may be hooked.

Figure 3:
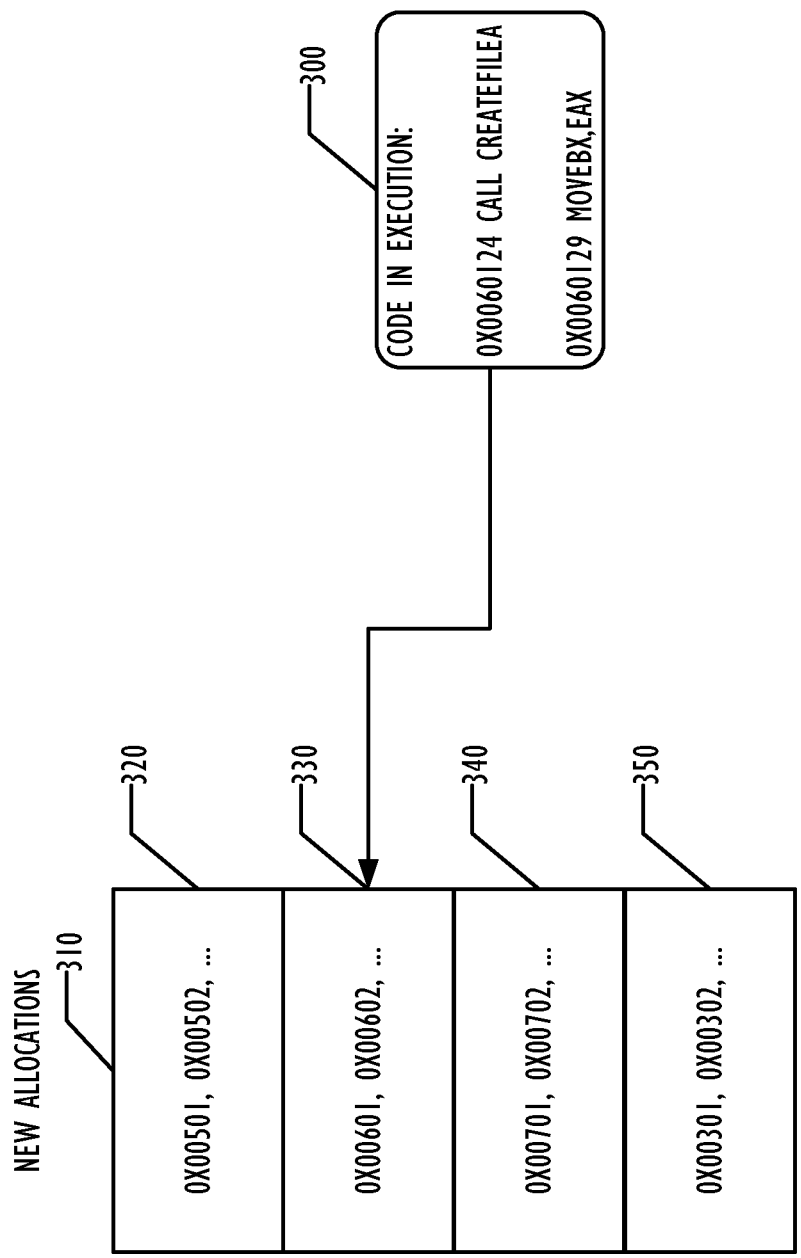
FIG. 3 is a block diagram illustrating a heuristic technique for generically unpacking a binary according to one embodiment.
Figure 4:
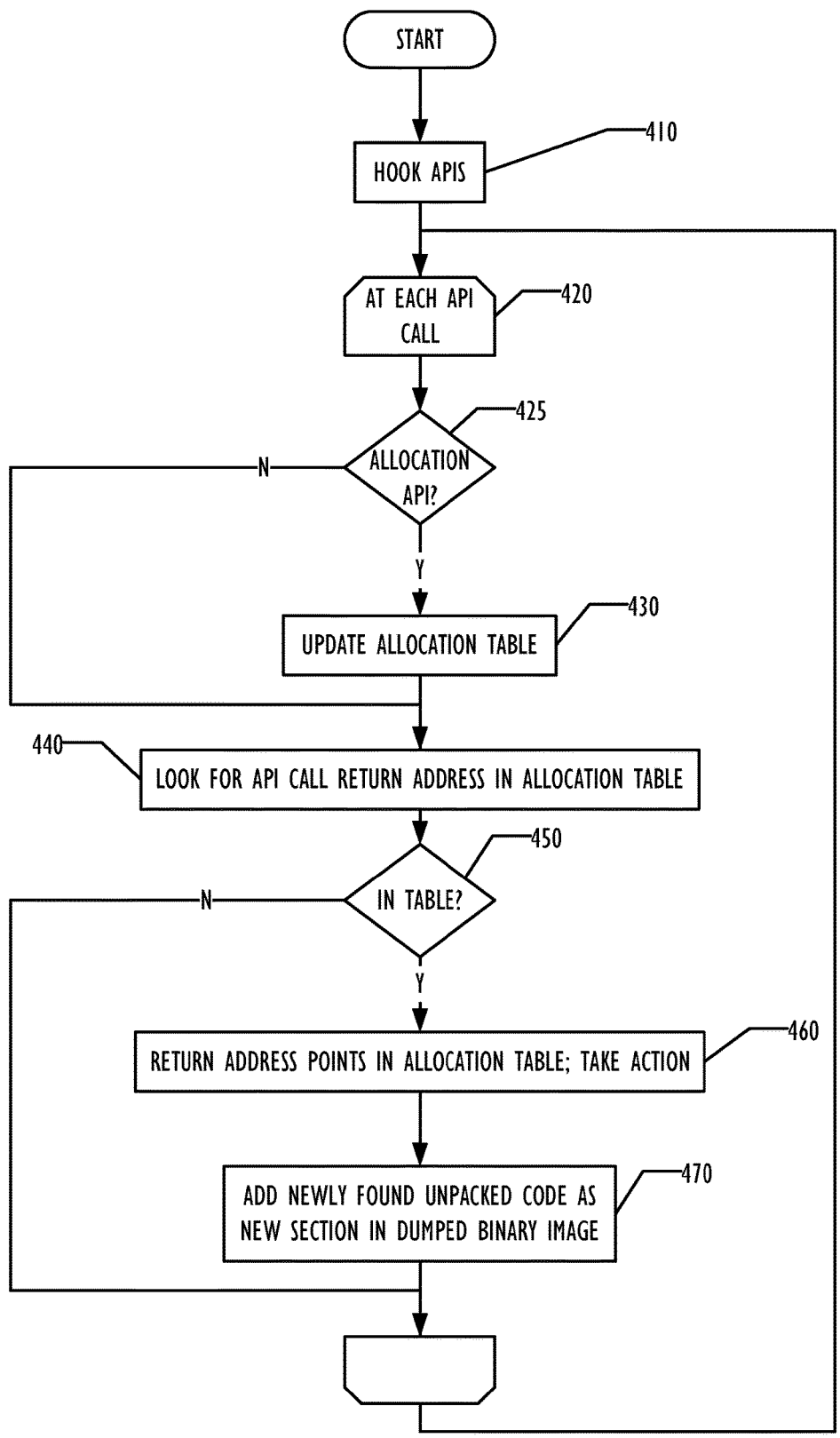
FIG. 4 is flowchart illustrating a heuristic technique for generically unpacking a binary according to one embodiment.

The first heuristic, illustrated in FIGS. 3 and 4, monitors new memory allocations. FIG. 3 illustrates a table of memory allocations 310, with 4 entries 320-350. As described in more detail below, code in execution 300 contains a CALL CreateFileA instruction at memory location 0x00601024, followed by a MOV EBX, EAX instruction at the return address. In the example of FIG. 3, because the return address 0x0060129 is found in the table at entry 330, the heuristic determines that unpacked code is being executed.

FIG. 4 is a flowchart illustrating the first heuristic technique according to one embodiment. In block 410, APIs are hooked. As indicated above, in some embodiments system related APIs may be hooked and in other embodiments, all exported APIs of kernel32.dll may be hooked. Other APIs may be hooked as desired. In this approach, memory allocations made by the binary are tracked. In one embodiment, the tracking is achieved by hooking the allocation APIs for LocalAlloc, HeapAlloc, VirtualAlloc, malloc, etc. In a further embodiment, the VirtualProtect API along with other allocation APIs may be hooked, as well.

Information describing the memory allocations may be stored into the table 310, including allocation pointers and allocation sizes. Any desired data structure or structures may be used for storing the allocation pointers and sizes in table 310, and the data may be stored in any desired format. Although only allocation pointers and sizes are referenced herein, other allocation-related data may be captured and stored in the allocation table 310.

Blocks 420-480 are then executed as each of the hooked APIs are called. In block 425, if the API is one of the hooked allocation APIs used to allocate new memory regions, in block 430 the allocation table 310 is updated. Then every API call return address may be analyzed in block 440 by scanning through the previously populated table 310. Any technique for searching the allocation table 310 may be used as desired. If the return address is contained in a previously allocated memory region as determined in block 450, then that allocation pointer is holding unpacked code and actions may be taken as desired in block 460. Once the heuristic technique finds unpacked code, malware detection algorithms may be performed on the unpacked binary. In one embodiment, the unpacking may be logged. For performing malware detection on the binary after the generic unpacking, the executing process can be dumped for analysis as a dumped image. The newly found unpacked code is preferably added as a new section into the dumped image in block 470 to maintain the alignment of the binary. The dumped image thus comprises an unpacked executable that may be scanned for malware.

In the discussion of the second heuristic below, the term "active binary image" is defined as the image that is currently mapped in memory and is in an execution state. The term "passive binary image" is defined as an image of the same binary used in the active binary image that is currently mapped in the memory but not in the execution state. The term "execution environment" is defined as the program that will execute the packed binary or interact with the binary in some way, for example, a dynamic link library (DLL) loaded into the packed binary.

In the second heuristic the packed binary is executed (the active binary image) and also mapped on another location (the passive binary image) for later reference. In various embodiments, this may be done by creating two different processes or by mapping the binary using code of the malware detection system. In an embodiment that creates two processes, only one binary is actually executed, while other process is paused, for example by keeping that process in a resumed state at the entry point. Creating two processes of the same binary can have some dangerous effects so is generally less preferred. The discussion below is written in terms of a system in which the binary images are mapped using code of the malware detection system.

The execution environment preferably maps the passive binary image in memory but depending on various conditions the execution environment may or may not be able to map the binary on the preferred address, i.e., the base address of the binary. For example, if the heuristics are implemented into a DLL then the passive image cannot be mapped on the base address because that address is already occupied by the active binary image. But if the heuristics are implemented in a sandbox or debugger, the passive image may be mappable on the base address.

From the active binary image the second heuristic logs the return address of API calls and then compares the bytes at the return address with those at the same location in the passive binary image. If the bytes at the return address in the active and passive binary images are identical, then the active binary image is still executing from a packed region; if the bytes are different then the active binary image is executing from the unpacked region. However, if the base addresses of both the active and passive images are different, then address translation is performed. For example, if an active binary image is mapped at 0x00400000 and passive binary image is mapped at 0x00500000, then address 0x00401000 from the active binary image can be found at 0x00501000 in the passive binary image.

Figure 5:
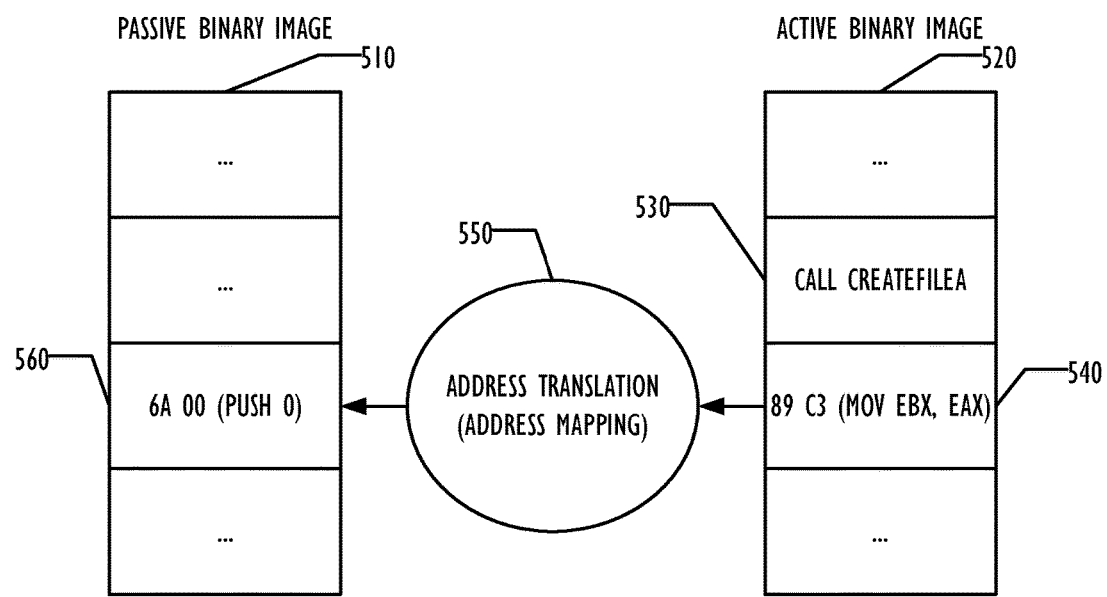
FIG. 5 is a block diagram illustrating another heuristic technique for generically unpacking a binary according to one embodiment.

FIG. 5 is a block diagram illustrating the second heuristic according to one embodiment. As stated above, two copies of the binary are used. A passive binary image 510 is loaded into memory and saved prior to execution. An active binary image is the copy of the binary that is actually executed. During execution, an API call is made, in this example the "Call CreateFileA" (530) which has a "MOV EBX, EAX" instruction (540) at the return address of the Call 530. The second heuristic compares the data at the return address 540 in the active binary image 520 with the data at the same address (560) in the passive binary image 510. If the data in location 560 differs from the data at address 540 in the active binary image—as in this example, where a "Push 0" instruction is found in the passive binary image—then we are executing unpacked code. The active binary image may then be dumped for malware analysis, as in the first heuristic.

As stated above, the address in the active binary image 520 may not be identical to the address in the passive binary image 510, however, if the base addresses of the two images are not identical. In that scenario, address translation may be performed as indicated by block 550 in FIG. 5.

Figure 6:
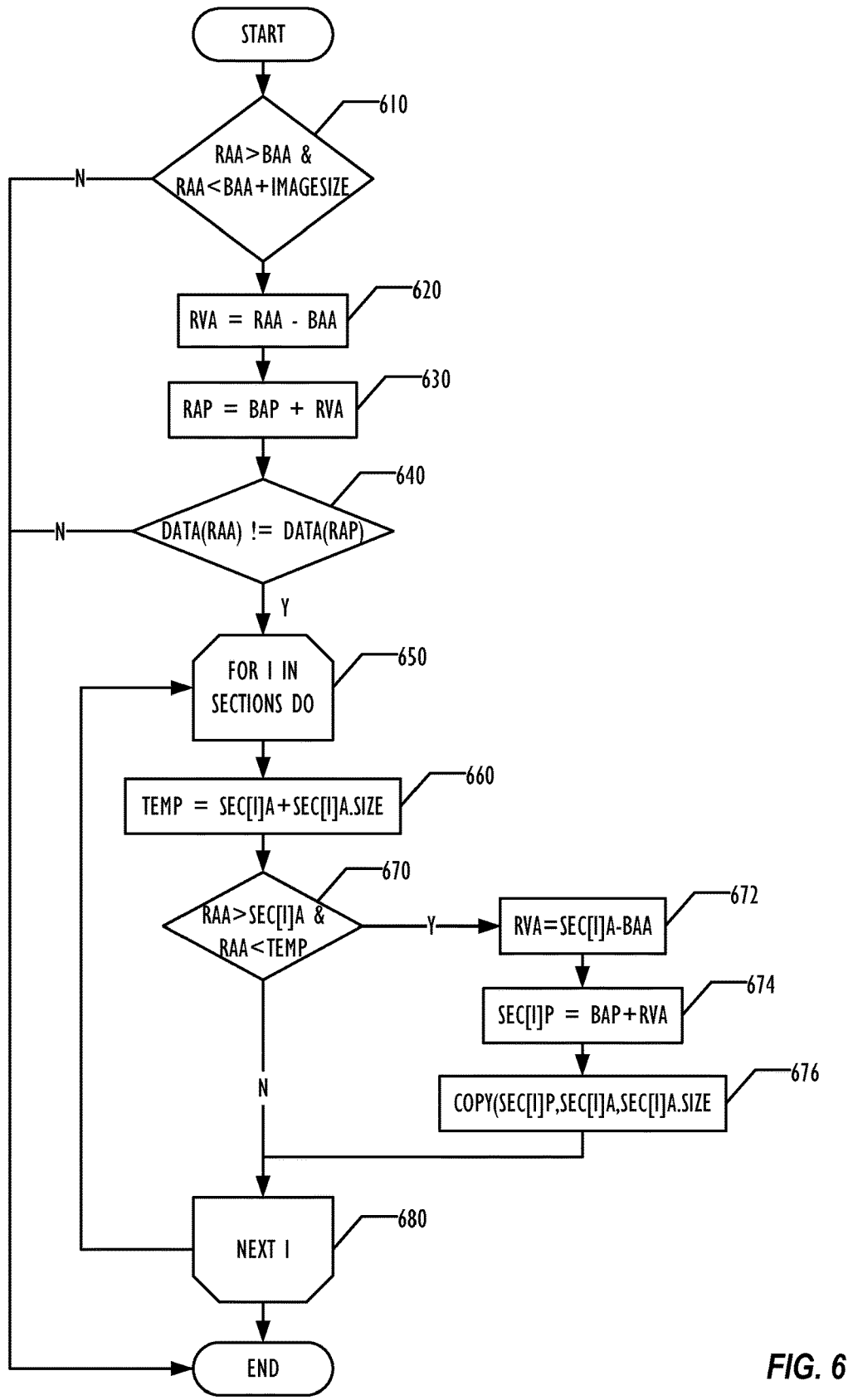
FIG. 6 is a flowchart illustrating the heuristic technique of FIG. 5.

FIG. 6 is a flowchart illustrating the analysis performed in the second heuristic by the hook set into the API calls by the execution environment according to one embodiment. In FIG. 6, the following notation is used:

RAA: the return address logged from the active binary image.
RAP: RAA equivalent in the passive binary image.
RVA: the Relative Virtual Address
Sec[i]A: the ith section virtual address in the active binary image.
Sec[i]P: the ith section virtual address in the passive binary image.
Sec[i]A.size: the ith section size (Sec[i+1]A-Sec[i]A) in the active binary image.
imagesize: the size of the active binary image in memory.
BAA: the base address of active binary image.
BAP: the base address of passive binary image.
data(address): three bytes of data fetched from address-2. E.g., if RAA is the address, then this operation will fetch three bytes of data starting from RAA-2.
copy(dst,src,size): copy size bytes from the source address to the destination address.

Turning now to FIG. 6, in block 610, the technique illustrated is performed every time a return address from a hooked API call is detected. The return address in the active binary image is logged and used for the computations described below.

The return address logged from the active binary image 520 is compared in block 610 to the base address of the active binary image 520. If the return address indicates an address outside of the active binary image, then this return address may be ignored, and unpacking continues to occur.

Then in block 520 the relative virtual address, i.e., the offset from the base address, is computed for the return address RAA in the active image. That offset is then used in block 630 to determine the address of the return address in the passive binary image by adding the offset to the base address of the passive binary image.

In block 640 the data at the return address of both active and passive binary images is compared. If the data at the return address in both images is the same, then this return address may be ignored, and unpacking continues to occur. If the data at the return address differs between images, however, then unpacking has occurred and that location in the active binary image when executed will execute unpacked code. Thus blocks 650-680 are performed for each section of the active binary image, copying the section of the active binary image containing the return address to the passive binary image.

In block 660, the end address of the section being considered is calculated. If the return address is not in the range of addresses of the section, as determined in block 670, then that section can be ignored and the next section, if any, considered.

If the return address is in the current section, then in block 672 an offset into the corresponding section of the passive binary image is calculated by subtracting the base address of the active binary image from the beginning address of the section. That offset is then added to the base address of the corresponding section of the passive binary image to determine the beginning address of the section of the passive binary image in block 674. Then in block 676 the section of the active binary image containing the return address is copied to the corresponding section of the passive binary image in block 676. This allows the passive binary image to be updated with the unpacked code, so that the passive binary image, which thus contains an unpacked executable, may be analyzed by the malware detection system.

Various embodiments may implement one or both of the first and second heuristics. After detecting that unpacked code is being executed, the unpacked executable may be scanned by the malware detection system for malware. The specific analysis techniques used by the malware detection system to scan the unpacked executable for malware are outside of the scope of this disclosure and are not further described.

Figure 7:
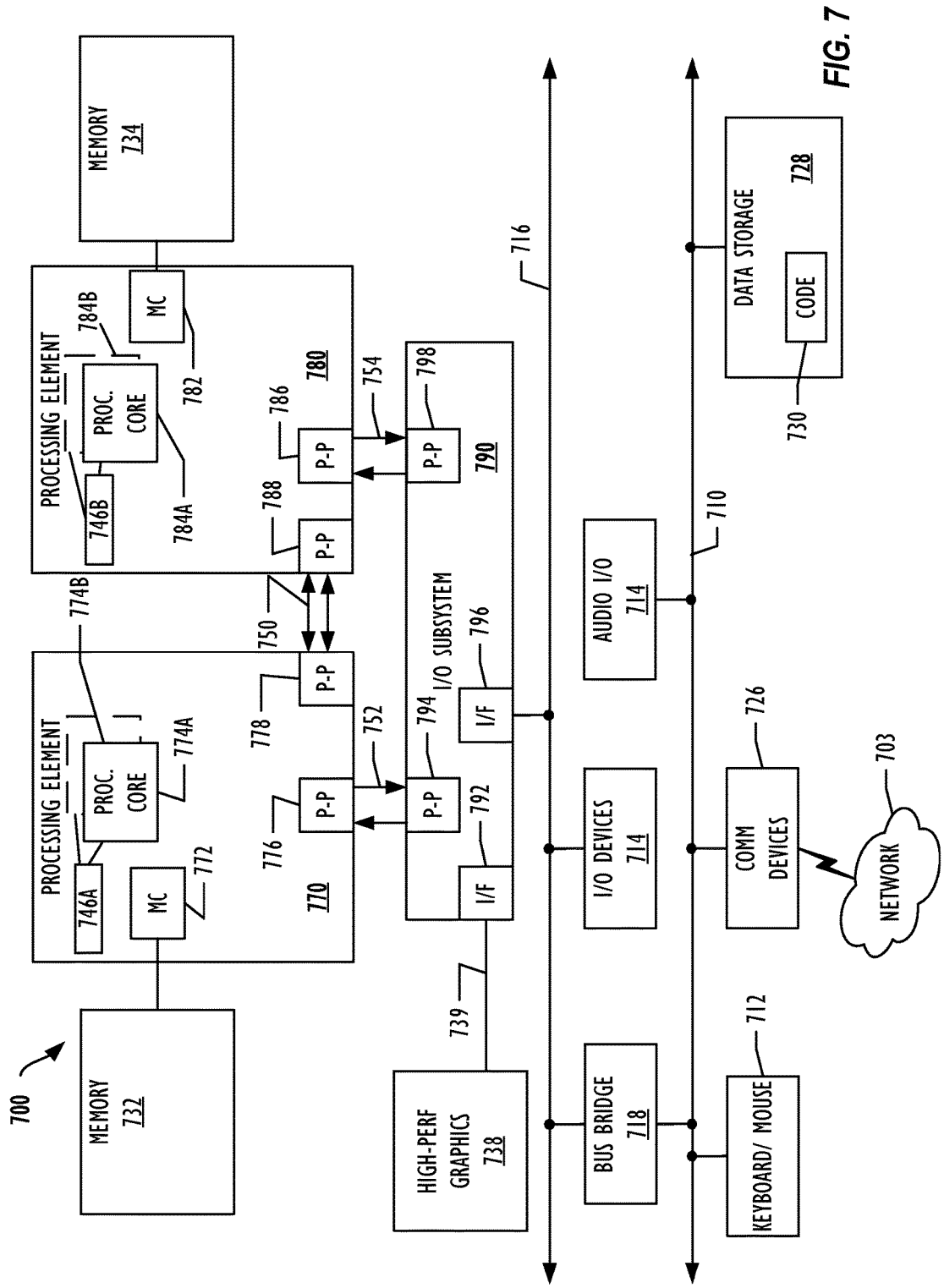
FIG. 7 is a block diagram illustrating a programmable device for use with techniques described herein according to one embodiment.

Referring now to FIG. 7, a block diagram illustrates a programmable device 700 that may employ the generic unpacking techniques described above in accordance with one embodiment. The programmable device illustrated in FIG. 7 is a multiprocessor programmable device 700 that includes a first processing element 770 and a second processing element 780. While two processing elements 770 and 780 are shown, an embodiment of programmable device 700 may also include only one such processing element.

Programmable device 700 is illustrated as a point-to-point interconnect system, in which the first processing element 770 and second processing element 780 are coupled via a point-to-point interconnect 750. Any or all of the interconnects illustrated in FIG. 7 may be implemented as multi-drop bus rather than point-to-point interconnects.

As illustrated in FIG. 7, each of processing elements 770 and 780 may be multicore processors, including first and second processor cores (i.e., processor cores 774a and 774b and processor cores 784a and 784b). Such cores 774a, 774b, 784a, 784b may be configured to execute instruction code in a manner similar to that discussed above in connection with FIGS. 1-3. However, other embodiments may use processing elements that are single core processors as desired. In embodiments with multiple processing elements 770, 780, each processing element may be implemented with different numbers of cores as desired.

Each processing element 770, 780 may include at least one shared cache 746. The shared cache 746a, 746b may store data (e.g., instructions) that are utilized by one or more components of the processing element, such as the cores 774a, 774b and 784a, 784b, respectively. For example, the shared cache may locally cache data stored in a memory 732, 734 for faster access by components of the processing elements 770, 780. In one or more embodiments, the shared cache 746a, 746b may include one or more mid-level caches, such as level 2 (L2), level 3 (L3), level 4 (L4), or other levels of cache, a last level cache (LLC), or combinations thereof.

While FIG. 7 illustrates a programmable device with two processing elements 770, 780 for clarity of the drawing, the scope of the present invention is not so limited and any number of processing elements may be present. Alternatively, one or more of processing elements 770, 780 may be an element other than a processor, such as an graphics processing unit (GPU), a digital signal processing (DSP) unit, a field programmable gate array, or any other programmable processing element. Processing element 780 may be heterogeneous or asymmetric to processing element 770. There can be a variety of differences between the processing elements 770, 780 in terms of a spectrum of metrics of merit including architectural, microarchitectural, thermal, power consumption characteristics, and the like. These differences may effectively manifest themselves as asymmetry and heterogeneity amongst the processing elements 770, 780. In some embodiments, the various processing elements 770, 780 may reside in the same die package.

First processing element 770 may further include memory controller logic (MC) 772 and point-to-point (P-P) interconnects 776 and 778. Similarly, second processing element 780 may include a MC 782 and P-P interconnects 786 and 788. As illustrated in FIG. 7, MCs 772 and 782 couple the processing elements 770, 780 to respective memories, namely a memory 732 and a memory 734, which may be portions of main memory locally attached to the respective processors. While MC logic 772 and 782 is illustrated as integrated into the processing elements 770, 780, in some embodiments the MC logic may be discrete logic outside the processing elements 770, 780 rather than integrated therein.

Processing element 770 and processing element 780 may be coupled to an I/O subsystem 790 via P-P interconnects 776, 786 and 784, respectively. As illustrated in FIG. 7, I/O subsystem 790 includes P-P interconnects 794 and 798. Furthermore, I/O subsystem 790 includes an interface 792 to couple I/O subsystem 790 with a high performance graphics engine 738. In one embodiment, bus 749 may be used to couple graphics engine 738 to I/O subsystem 790. Alternately, a point-to-point interconnect 739 may couple these components.

In turn, I/O subsystem 790 may be coupled to a first link 716 via an interface 796. In one embodiment, first link 716 may be a Peripheral Component Interconnect (PCI) bus, or a bus such as a PCI Express bus or another I/O interconnect bus, although the scope of the present invention is not so limited.

As illustrated in FIG. 7, various I/O devices 714 may be coupled to first link 716, along with a bridge 718 which may couple first link 716 to a second link 710. In one embodiment, second link 720 may be a low pin count (LPC) bus. Various devices may be coupled to second link 720 including, for example, a keyboard/mouse 712, communication device(s) 726 (which may in turn be in communication with the computer network 703), and a data storage unit 728 such as a disk drive or other mass storage device which may include code 730, in one embodiment. The code 730 may include instructions for performing embodiments of one or more of the techniques described above. Further, an audio I/O 724 may be coupled to second bus 720.

Note that other embodiments are contemplated. For example, instead of the point-to-point architecture of FIG. 7, a system may implement a multi-drop bus or another such communication topology. Although links 716 and 720 are illustrated as busses in FIG. 7, any desired type of link can be used. Also, the elements of FIG. 7 may alternatively be partitioned using more or fewer integrated chips than illustrated in FIG. 7.

Figure 8:
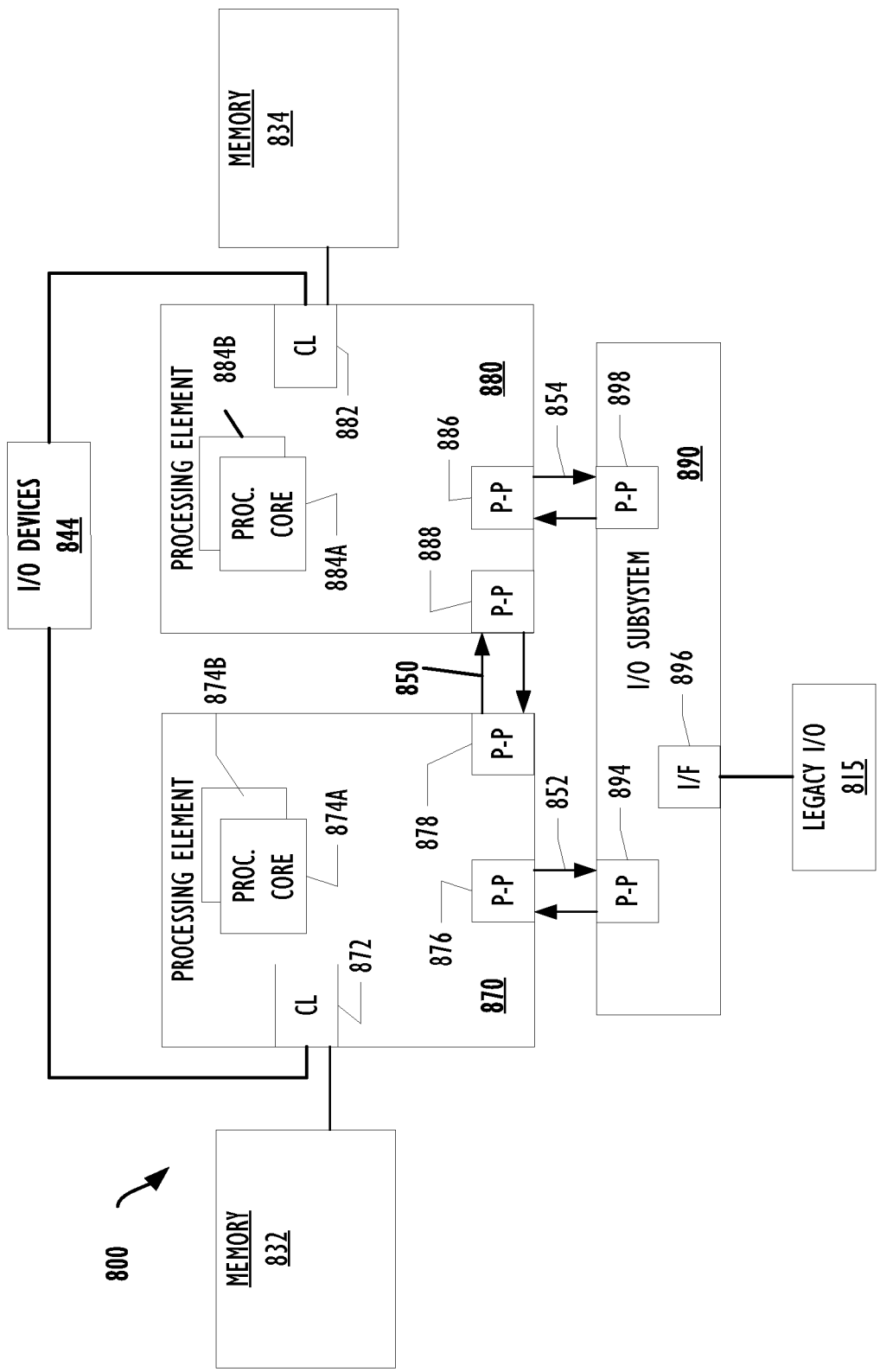
FIG. 8 is a block diagram illustrating a programmable device for use with techniques described herein according to another embodiment.

Referring now to FIG. 8, a block diagram illustrates a programmable device 800 according to another embodiment. Certain aspects of FIG. 7 have been omitted from FIG. 8 in order to avoid obscuring other aspects of FIG. 8.

FIG. 8 illustrates that processing elements 870, 880 may include integrated memory and I/O control logic ("CL") 872 and 882, respectively. In some embodiments, the CL 872, 882 may include memory control logic (MC) such as that described above in connection with FIG. 7. In addition, CL 872, 882 may also include I/O control logic. FIG. 8 illustrates that not only may the memories 832, 834 be coupled to the CL 872, 882, but also that I/O devices 814 may also be coupled to the control logic 872, 882. Legacy I/O devices 815 may be coupled to the I/O subsystem 890.

The programmable devices depicted in FIG. 7 and FIG. 8 are schematic illustrations of embodiments of programmable devices which may be utilized to implement various embodiments discussed herein. It will be appreciated that various components of the programmable devices depicted in FIG. 7 and FIG. 8 may be combined in a system-on-a-chip (SoC) architecture.

The following examples pertain to further embodiments.

Example 1 is a machine readable medium, on which are stored instructions, including instructions that when executed cause a programmable device to: load a self-extracting executable into memory, the self-extracting executable including a first unpacking stub and a packed executable; allow the unpacking stub to unpack the packed executable into an unpacked executable; and detect completion of the unpacking stub using one or more heuristics, independent of knowledge of the unpacking stub, wherein the one or more heuristics include instructions that when executed cause the programmable device to: detect an application programming interface call; and determine a return address for the application programming interface call; and determine whether unpacked code is being executed based on the return address.

Example 2 includes the subject matter of example 1, wherein the instructions stored on the medium further include instructions that when executed cause the programmable device to: scan the unpacked executable for malware.

Example 3 includes the subject matter of example 1, wherein the instructions that when executed cause the programmable device to detect an application programming interface call include instructions that when executed cause the programmable device to: detect system related application programming interface calls.

Example 4 includes the subject matter of example 1, wherein the instructions that when executed cause the programmable device to detect an application programming interface call include instructions that when executed cause the programmable device to: detect any of a predetermined set of application programming interface calls.

Example 5 includes the subject matter of any of examples 1-4, wherein the instructions that when executed cause the programmable device to determine whether unpacked code is being executed based on the return address include instructions that when executed cause the programmable device to: determine whether the return address is in a region of memory previously allocated by the self-extracting executable; and determine that unpacked code is being executed responsive to the determination that the return address is in a region of memory previously allocated by the self-extracting executable.

Example 6 includes the subject matter of any of examples 1-4, wherein the instructions that when executed cause the programmable device to detect an application programming interface call include instructions that when executed cause the programmable device to: detect an allocation of memory by the self-extracting executable; and record memory allocation data corresponding to the allocation of memory.

Example 7 includes the subject matter of example 6, wherein the instructions that when executed cause the programmable device to determine whether unpacked code is being executed based on the return address include instructions that when executed cause the programmable device to: determine whether the return address is in one of the recorded allocations of memory based on the memory allocation data; and determine that unpacked code is being executed responsive to the determination that the return address is in one of the recorded allocations of memory.

Example 8 includes the subject matter of any of examples 1-4, wherein the instructions that when executed cause the programmable device to determine whether unpacked code is being executed based on the return address include instructions that when executed cause the programmable device to: compare memory contents at the return address in an active binary image with memory contents at the return address in a passive binary image; and determine that unpacked code is being executed responsive to the comparison.

Example 9 includes the subject matter of example 8, wherein the instructions that when executed cause the programmable device to determine whether unpacked code is being executed based on the return address further include instructions that when executed cause the programmable device to: translate the return address in the active binary image to an address in the passive binary image.

Example 10 is a system for detecting malware, including: one or more processing elements; and a memory, coupled to the one or more processing elements, on which are stored instructions that when executed cause the one or more processing elements to: load a self-extracting executable into memory, the self-extracting executable including a unpacking stub and a packed executable; allow the unpacking stub to unpack the packed executable into an unpacked executable; and detect completion of the first unpacking stub using one or more heuristics, independent of knowledge of the first unpacking stub, wherein the one or more heuristics include instructions that when executed cause one or more processing elements to: determine a return address for an application programming interface call; and determine whether unpacked code is being executed based on the return address.

Example 11 includes the subject matter of example 10, wherein the instructions that when executed cause one or more processing elements to determine a return address for an application programming interface call include instructions that when executed cause the one or more processing elements to: detect an application programming interface call by the self-extracting executable.

Example 12 includes the subject matter of example 10, wherein the instructions further include instructions that when executed cause the programmable device to: scan the unpacked executable for malware.

Example 13 includes the subject matter of example 10, wherein the instructions that when executed cause the one or more processing elements to detect an application programming interface call include instructions that when executed cause the one or more processing elements to: detect system related application programming interface calls.

Example 14 includes the subject matter of example 10, wherein the instructions that when executed cause the one or more processing elements to detect an application programming interface call include instructions that when executed cause the one or more processing elements to: detect any of a predetermined set of application programming interface calls.

Example 15 includes the subject matter of any of examples 10-14, wherein the instructions that when executed cause the one or more processing elements to determine whether unpacked code is being executed based on the return address include instructions that when executed cause the one or more processing elements to: determine whether the return address is in a region of memory previously allocated by the self-extracting executable; and determine that unpacked code is being executed responsive to the determination that the return address is in a region of memory previously allocated by the self-extracting executable.

Example 16 includes the subject matter of any of examples 10-14, wherein the instructions that when executed cause the one or more processing elements to detect an application programming interface call include instructions that when executed cause the one or more processing elements to: detect an allocation of memory by the self-extracting executable; and record memory allocation data corresponding to the allocation of memory.

Example 17 includes the subject matter of example 16, wherein the instructions that when executed cause the one or more processing elements to determine whether unpacked code is being executed based on the return address include instructions that when executed cause the one or more processing elements to: determine whether the return address is in one of the recorded allocations of memory based on the memory allocation data; and determine that unpacked code is being executed responsive to the determination that the return address is in one of the recorded allocations of memory.

Example 18 includes the subject matter of any of examples 10-14, wherein the instructions that when executed cause the one or more processing elements to determine whether unpacked code is being executed based on the return address include instructions that when executed cause the one or more processing elements to: compare memory contents at the return address in an active binary image with memory contents at the return address in a passive binary image; and determine that unpacked code is being executed responsive to the comparison.

Example 19 includes the subject matter of example 18, wherein the instructions that when executed cause the one or more processing elements to determine whether unpacked code is being executed based on the return address further include instructions that when executed cause the one or more processing elements to: translate the return address in the active binary image to an address in the passive binary image.

Example 20 is a method of unpacking a packed binary, including: executing the packed binary in a programmable device, allowing an unpacking stub of the packed binary to unpacked a packed executable of the packed binary into an unpacked executable; detecting an application programming call by the backed binary; determining a return address for the application programming interface; determining whether unpacked code is being executed based on the return address; and scanning the unpacked executable for malware.

Example 21 includes the subject matter of example 20, wherein determining whether unpacked code is being executed includes: determining that unpacked code is being executed responsive to a determination that the return address is in a region of memory previous allocated by the packed binary.

Example 22 includes the subject matter of example 21, wherein determining whether unpacked code is being executed further includes capturing memory allocation data upon an allocation of memory by the packed binary.

Example 23 includes the subject matter of example 21, wherein determining whether unpacked code is being executed includes: mapping the packed binary into memory as a passive image and executing the packed binary as an active image; and comparing memory contents at the return address in the passive image with memory contents at the return address in the active image.

Example 24 includes the subject matter of example 23, wherein determining whether unpacked code is being executed further includes: translating the return address in the active image into a return address in the passive image.

Example 25 is a system including means for executing a method as described in examples 20-24.

Example 26 is a programmable device, including: a processing element, a memory, a module to load a self-extracting executable into the memory for execution by the processing element, the self-extracting executable including a first unpacking stub and a packed executable; a module to allow the unpacking stub, when executed by the processing element, to unpack the packed executable into an unpacked executable; and a module to detect completion of the unpacking stub using one or more heuristics, independent of knowledge of the unpacking stub, wherein the one or more heuristics include modules to cause the programmable device to: detect an application programming interface call; and determine a return address for the application programming interface call; and determine whether unpacked code is being executed based on the return address.

Example 27 includes the subject matter of example 26, further including: a module scan the unpacked executable for malware.

Example 28 includes the subject matter of example 26, wherein the module to cause the programmable device to detect an application programming interface call includes a module to detect system related application programming interface calls.

Example 29 includes the subject matter of example 26, wherein the module to cause the programmable device to detect an application programming interface call includes a module to detect any of a predetermined set of application programming interface calls.

Example 30 includes the subject matter of any of examples 26-29, wherein the module to cause the programmable device to determine whether unpacked code is being executed based on the return address includes a module to cause the programmable device to: determine whether the return address is in a region of memory previously allocated by the self-extracting executable; and determine that unpacked code is being executed responsive to the determination that the return address is in a region of memory previously allocated by the self-extracting executable.

Example 31 includes the subject matter of any of examples 26-29, wherein the module to cause the programmable device to detect an application programming interface call includes a module to cause the programmable device to: detect an allocation of memory by the self-extracting executable; and record memory allocation data corresponding to the allocation of memory.

Example 32 includes the subject matter of example 31, wherein the module to cause the programmable device to determine whether unpacked code is being executed based on the return address includes a module to cause the programmable device to: determine whether the return address is in one of the recorded allocations of memory based on the memory allocation data; and determine that unpacked code is being executed responsive to the determination that the return address is in one of the recorded allocations of memory.

Example 33 includes the subject matter of any of examples 26-29, wherein the module to cause the programmable device to determine whether unpacked code is being executed based on the return address includes a module to cause the programmable device to: compare memory contents at the return address in an active binary image with memory contents at the return address in a passive binary image; and determine that unpacked code is being executed responsive to the comparison.

Example 34 includes the subject matter of example 33, wherein the module to cause the programmable device to determine whether unpacked code is being executed based on the return address further includes a module to cause the programmable device to: translate the return address in the active binary image to an address in the passive binary image.

Example 35 is a system for detecting malware, including: one or more processing elements; and a memory, coupled to the one or more processing elements, on which are stored instructions that when executed cause the one or more processing elements to: load a self-extracting executable into memory, the self-extracting executable including a unpacking stub and a packed executable; allow the unpacking stub to unpack the packed executable into an unpacked executable; and detect completion of the first unpacking stub using one or more heuristics, independent of knowledge of the first unpacking stub, wherein the one or more heuristics include instructions that when executed cause one or more processing elements to: determine a return address for an application programming interface call; and determine whether unpacked code is being executed based on the return address.

Example 36 includes the subject matter of example 35, wherein the instructions that when executed cause one or more processing elements to determine a return address for an application programming interface call include instructions that when executed cause the one or more processing elements to: detect an application programming interface call by the self-extracting executable.

Example 37 includes the subject matter of example 35, wherein the instructions further include instructions that when executed cause the programmable device to: scan the unpacked executable for malware.

Example 38 includes the subject matter of example 35, wherein the instructions that when executed cause the one or more processing elements to detect an application programming interface call include instructions that when executed cause the one or more processing elements to: detect system related application programming interface calls.

Example 39 includes the subject matter of example 35, wherein the instructions that when executed cause the one or more processing elements to detect an application programming interface call include instructions that when executed cause the one or more processing elements to: detect any of a predetermined set of application programming interface calls.

Example 40 includes the subject matter of any of examples 35-39, wherein the instructions that when executed cause the one or more processing elements to determine whether unpacked code is being executed based on the return address include instructions that when executed cause the one or more processing elements to: determine whether the return address is in a region of memory previously allocated by the self-extracting executable; and determine that unpacked code is being executed responsive to the determination that the return address is in a region of memory previously allocated by the self-extracting executable.

Example 41 includes the subject matter of any of examples 35-39, wherein the instructions that when executed cause the one or more processing elements to detect an application programming interface call include instructions that when executed cause the one or more processing elements to: detect an allocation of memory by the self-extracting executable; and record memory allocation data corresponding to the allocation of memory.

Example 42 includes the subject matter of example 41, wherein the instructions that when executed cause the one or more processing elements to determine whether unpacked code is being executed based on the return address include instructions that when executed cause the one or more processing elements to: determine whether the return address is in one of the recorded allocations of memory based on the memory allocation data; and determine that unpacked code is being executed responsive to the determination that the return address is in one of the recorded allocations of memory.

Example 43 includes the subject matter of any of examples 35-39, wherein the instructions that when executed cause the one or more processing elements to determine whether unpacked code is being executed based on the return address include instructions that when executed cause the one or more processing elements to: compare memory contents at the return address in an active binary image with memory contents at the return address in a passive binary image; and determine that unpacked code is being executed responsive to the comparison.

Example 44 includes the subject matter of example 43, wherein the instructions that when executed cause the one or more processing elements to determine whether unpacked code is being executed based on the return address further include instructions that when executed cause the one or more processing elements to: translate the return address in the active binary image to an address in the passive binary image.

Example 45 is a method of unpacking a packed binary, including: executing the packed binary in a programmable device, allowing an unpacking stub of the packed binary to unpacked a packed executable of the packed binary into an unpacked executable; detecting an application programming call by the backed binary; determining a return address for the application programming interface; determining whether unpacked code is being executed based on the return address; and scanning the unpacked executable for malware.

Example 46 includes the subject matter of example 45, wherein determining whether unpacked code is being executed includes: determining that unpacked code is being executed responsive to a determination that the return address is in a region of memory previous allocated by the packed binary.

Example 47 includes the subject matter of example 46, wherein determining whether unpacked code is being executed further includes capturing memory allocation data upon an allocation of memory by the packed binary.

Example 48 includes the subject matter of example 46, wherein determining whether unpacked code is being executed includes: mapping the packed binary into memory as a passive image and executing the packed binary as an active image; and comparing memory contents at the return address in the passive image with memory contents at the return address in the active image.

Example 49 includes the subject matter of example 48, wherein determining whether unpacked code is being executed further includes: translating the return address in the active image into a return address in the passive image.

Example 50 is a machine readable medium on which are stored instructions that when executed cause a machine to perform a method as described in examples 45-49.

Example 51 is a machine readable medium, on which are stored instructions, including instructions that when executed cause a programmable device to: load a self-extracting executable into memory, the self-extracting executable including a first unpacking stub and a packed executable; allow the unpacking stub to unpack the packed executable into an unpacked executable; and detect completion of the unpacking stub using one or more heuristics, independent of knowledge of the unpacking stub, wherein the one or more heuristics include instructions that when executed cause the programmable device to: detect an application programming interface call; and determine a return address for the application programming interface call; and determine whether unpacked code is being executed based on the return address.

Example 52 includes the subject matter of example 51, wherein the instructions stored on the medium further include instructions that when executed cause the programmable device to: scan the unpacked executable for malware.

Example 53 includes the subject matter of example 51, wherein the instructions that when executed cause the programmable device to detect an application programming interface call include instructions that when executed cause the programmable device to: detect system related application programming interface calls.

Example 54 includes the subject matter of example 51, wherein the instructions that when executed cause the programmable device to detect an application programming interface call include instructions that when executed cause the programmable device to: detect any of a predetermined set of application programming interface calls.

Example 55 includes the subject matter of example 51, wherein the instructions that when executed cause the programmable device to determine whether unpacked code is being executed based on the return address include instructions that when executed cause the programmable device to: determine whether the return address is in a region of memory previously allocated by the self-extracting executable; and determine that unpacked code is being executed responsive to the determination that the return address is in a region of memory previously allocated by the self-extracting executable.

Example 56 includes the subject matter of example 51, wherein the instructions that when executed cause the programmable device to detect an application programming interface call include instructions that when executed cause the programmable device to: detect an allocation of memory by the self-extracting executable; and record memory allocation data corresponding to the allocation of memory.

Example 57 includes the subject matter of example 56, wherein the instructions that when executed cause the programmable device to determine whether unpacked code is being executed based on the return address include instructions that when executed cause the programmable device to: determine whether the return address is in one of the recorded allocations of memory based on the memory allocation data; and determine that unpacked code is being executed responsive to the determination that the return address is in one of the recorded allocations of memory.

Example 58 includes the subject matter of example 51, wherein the instructions that when executed cause the programmable device to determine whether unpacked code is being executed based on the return address include instructions that when executed cause the programmable device to: compare memory contents at the return address in an active binary image with memory contents at the return address in a passive binary image; and determine that unpacked code is being executed responsive to the comparison.

Example 59 includes the subject matter of example 58, wherein the instructions that when executed cause the programmable device to determine whether unpacked code is being executed based on the return address further include instructions that when executed cause the programmable device to: translate the return address in the active binary image to an address in the passive binary image.

Example 60 is a system for detecting malware, including: one or more processing elements; and a memory, coupled to the one or more processing elements, on which are stored instructions that when executed cause the one or more processing elements to: load a self-extracting executable into memory, the self-extracting executable including a unpacking stub and a packed executable; allow the unpacking stub to unpack the packed executable into an unpacked executable; and detect completion of the first unpacking stub using one or more heuristics, independent of knowledge of the first unpacking stub, wherein the one or more heuristics include instructions that when executed cause one or more processing elements to: determine a return address for an application programming interface call; and determine whether unpacked code is being executed based on the return address.

Example 61 includes the subject matter of example 60, wherein the instructions that when executed cause one or more processing elements to determine a return address for an application programming interface call include instructions that when executed cause the one or more processing elements to: detect an application programming interface call by the self-extracting executable.

Example 62 includes the subject matter of example 60, wherein the instructions further include instructions that when executed cause the programmable device to: scan the unpacked executable for malware.

Example 63 includes the subject matter of example 60, wherein the instructions that when executed cause the one or more processing elements to detect an application programming interface call include instructions that when executed cause the one or more processing elements to: detect system related application programming interface calls.

Example 64 includes the subject matter of example 60, wherein the instructions that when executed cause the one or more processing elements to detect an application programming interface call include instructions that when executed cause the one or more processing elements to: detect any of a predetermined set of application programming interface calls.

Example 65 includes the subject matter of example 60, wherein the instructions that when executed cause the one or more processing elements to determine whether unpacked code is being executed based on the return address include instructions that when executed cause the one or more processing elements to: determine whether the return address is in a region of memory previously allocated by the self-extracting executable; and determine that unpacked code is being executed responsive to the determination that the return address is in a region of memory previously allocated by the self-extracting executable.

Example 66 includes the subject matter of example 60, wherein the instructions that when executed cause the one or more processing elements to detect an application programming interface call include instructions that when executed cause the one or more processing elements to: detect an allocation of memory by the self-extracting executable; and record memory allocation data corresponding to the allocation of memory.

Example 67 includes the subject matter of example 66, wherein the instructions that when executed cause the one or more processing elements to determine whether unpacked code is being executed based on the return address include instructions that when executed cause the one or more processing elements to: determine whether the return address is in one of the recorded allocations of memory based on the memory allocation data; and determine that unpacked code is being executed responsive to the determination that the return address is in one of the recorded allocations of memory.

Example 68 includes the subject matter of example 60, wherein the instructions that when executed cause the one or more processing elements to determine whether unpacked code is being executed based on the return address include instructions that when executed cause the one or more processing elements to: compare memory contents at the return address in an active binary image with memory contents at the return address in a passive binary image; and determine that unpacked code is being executed responsive to the comparison.

Example 69 includes the subject matter of example 68, wherein the instructions that when executed cause the one or more processing elements to determine whether unpacked code is being executed based on the return address further include instructions that when executed cause the one or more processing elements to: translate the return address in the active binary image to an address in the passive binary image.

Example 70 is a method of unpacking a packed binary, including: executing the packed binary in a programmable device, allowing an unpacking stub of the packed binary to unpacked a packed executable of the packed binary into an unpacked executable; detecting an application programming call by the backed binary; determining a return address for the application programming interface; determining whether unpacked code is being executed based on the return address; and scanning the unpacked executable for malware.

Example 71 includes the subject matter of example 70, wherein determining whether unpacked code is being executed includes: determining that unpacked code is being executed responsive to a determination that the return address is in a region of memory previous allocated by the packed binary.

Example 72 includes the subject matter of example 71, wherein determining whether unpacked code is being executed further includes capturing memory allocation data upon an allocation of memory by the packed binary.

Example 73 includes the subject matter of example 71, wherein determining whether unpacked code is being executed includes: mapping the packed binary into memory as a passive image and executing the packed binary as an active image; and comparing memory contents at the return address in the passive image with memory contents at the return address in the active image.

Example 74 includes the subject matter of example 73, wherein determining whether unpacked code is being executed further includes: translating the return address in the active image into a return address in the passive image.

Example 75 is a machine readable medium, on which are stored instructions, including instructions that when executed cause a programmable device to: load a self-extracting executable into memory, the self-extracting executable including a first unpacking stub and a packed executable; allow the unpacking stub to unpack the packed executable into an unpacked executable; and detect completion of the unpacking stub using one or more heuristics, independent of knowledge of the unpacking stub, wherein the one or more heuristics include instructions that when executed cause the programmable device to: detect an application programming interface call; and determine a return address for the application programming interface call; and determine whether unpacked code is being executed based on the return address.

Example 76 includes the subject matter of example 75, wherein the instructions that when executed cause the programmable device to determine whether unpacked code is being executed based on the return address include instructions that when executed cause the programmable device to: determine whether the return address is in a region of memory previously allocated by the self-extracting executable; and determine that unpacked code is being executed responsive to the determination that the return address is in a region of memory previously allocated by the self-extracting executable.

Example 77 includes the subject matter of example 75, wherein the instructions that when executed cause the programmable device to detect an application programming interface call include instructions that when executed cause the programmable device to: detect an allocation of memory by the self-extracting executable; and record memory allocation data corresponding to the allocation of memory.

Example 78 includes the subject matter of any of examples 75-77, wherein the instructions that when executed cause the programmable device to determine whether unpacked code is being executed based on the return address include instructions that when executed cause the programmable device to: determine whether the return address is in one of the recorded allocations of memory based on the memory allocation data; and determine that unpacked code is being executed responsive to the determination that the return address is in one of the recorded allocations of memory.

Example 79 includes the subject matter of example 75, wherein the instructions that when executed cause the programmable device to determine whether unpacked code is being executed based on the return address include instructions that when executed cause the programmable device to:

compare memory contents at the return address in an active binary image with memory contents at the return address in a passive binary image; and determine that unpacked code is being executed responsive to the comparison.

Example 80 includes the subject matter of example 79, wherein the instructions that when executed cause the programmable device to determine whether unpacked code is being executed based on the return address further include instructions that when executed cause the programmable device to: translate the return address in the active binary image to an address in the passive binary image.

Example 81 is a system for detecting malware, including: one or more processing elements; and a memory, coupled to the one or more processing elements, on which are stored instructions that when executed cause the one or more processing elements to: load a self-extracting executable into memory, the self-extracting executable including a unpacking stub and a packed executable; allow the unpacking stub to unpack the packed executable into an unpacked executable; and detect completion of the first unpacking stub using one or more heuristics, independent of knowledge of the first unpacking stub, wherein the one or more heuristics include instructions that when executed cause one or more processing elements to: determine a return address for an application programming interface call; and determine whether unpacked code is being executed based on the return address; and optionally scan the unpacked executable for malware.

Example 82 includes the subject matter of example 81, wherein the instructions that when executed cause one or more processing elements to determine a return address for an application programming interface call include instructions that when executed cause the one or more processing elements to: detect an application programming interface call by the self-extracting executable.

Example 83 includes the subject matter of any of examples 81-82, wherein the instructions that when executed cause the one or more processing elements to determine whether unpacked code is being executed based on the return address include instructions that when executed cause the one or more processing elements to: determine whether the return address is in a region of memory previously allocated by the self-extracting executable; and determine that unpacked code is being executed responsive to the determination that the return address is in a region of memory previously allocated by the self-extracting executable.

Example 84 includes the subject matter of any of examples 81-82, wherein the instructions that when executed cause the one or more processing elements to detect an application programming interface call include instructions that when executed cause the one or more processing elements to: detect an allocation of memory by the self-extracting executable; and record memory allocation data corresponding to the allocation of memory.

Example 85 includes the subject matter of example 84, wherein the instructions that when executed cause the one or more processing elements to determine whether unpacked code is being executed based on the return address include instructions that when executed cause the one or more processing elements to: determine whether the return address is in one of the recorded allocations of memory based on the memory allocation data; and determine that unpacked code is being executed responsive to the determination that the return address is in one of the recorded allocations of memory.

Example 86 includes the subject matter of any of examples 81-82, wherein the instructions that when executed cause the one or more processing elements to determine whether unpacked code is being executed based on the return address include instructions that when executed cause the one or more processing elements to: compare memory contents at the return address in an active binary image with memory contents at the return address in a passive binary image; and determine that unpacked code is being executed responsive to the comparison.

Example 87 includes the subject matter of example 86, wherein the instructions that when executed cause the one or more processing elements to determine whether unpacked code is being executed based on the return address further include instructions that when executed cause the one or more processing elements to: translate the return address in the active binary image to an address in the passive binary image.

Example 88 is a method of unpacking a packed binary, including: executing the packed binary in a programmable device, allowing an unpacking stub of the packed binary to unpacked a packed executable of the packed binary into an unpacked executable; detecting an application programming call by the backed binary; determining a return address for the application programming interface; determining whether unpacked code is being executed based on the return address; and optionally scanning the unpacked executable for malware.

Example 89 includes the subject matter of example 88, wherein determining whether unpacked code is being executed includes one of: determining that unpacked code is being executed responsive to a determination that the return address is in a region of memory previous allocated by the packed binary; or comparing memory contents at the return address in a passive image of the packed binary, mapped into memory, with memory contents at the return address in the packed binary executing as an active image.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A storage disk or storage device comprising instructions for detecting malware that, when executed, cause a processor to at least:
   load a self-extracting first executable into memory, the self-extracting first executable including an unpacking second executable and a packed third executable; and
   after the unpacking second executable unpacks the packed third executable into a fourth executable:
   detect an application programming interface call;
   determine a return address for the application programming interface call;
   determine whether the fourth executable is being executed based on the return address not being in a region of memory previously allocated to the self-extracting first executable; and
   when the fourth executable is being executed, scan the fourth executable for malware.

2. The storage disk or storage device of claim 1, wherein the instructions, when executed cause the processor to detect the application programming interface call by detecting system related application programming interface calls.

3. The storage disk or storage device of claim 1, wherein the instructions, when executed, cause the processor to detect the application programming interface call by detecting any of a set of application programming interface calls.

4. The storage disk or storage device of claim 1, wherein the instructions, when executed, cause the processor to detect the application programming interface call by: detecting an allocation of the region of memory by the self-extracting first executable; and recording memory allocation data corresponding to the region of memory.

5. The storage disk or storage device of claim 4, wherein the instructions, when executed, cause the processor to determine whether the fourth executable is being executed based on the recorded memory allocation data.

6. The storage disk or storage device of claim 1, wherein the instructions, when executed, cause the processor to determine whether the fourth executable is being executed based on the return address not in the region of memory previously allocated by: comparing memory contents at the return address in an active binary image with memory contents at the return address in a passive binary image.

7. The storage disk or storage device of claim 6, wherein the instructions, when executed, cause the processor to translate the return address in the active binary image to an address in the passive binary image.

8. A system for detecting malware, comprising:
a processor; and
a first memory including instructions that, when executed, cause the processor to at least:
load a self-extracting first executable into a second memory, the self-extracting first executable including an unpacking second executable and a packed third executable;
after the unpacking second executable has unpacked the packed third executable into a fourth executable:
determine a return address for an application programming interface call; and
in response to the return address not being in a region of memory previously allocated to the self-extracting first executable, scan the fourth executable for malware.

9. The system of claim 8, wherein the instructions, when executed, cause the processor to: determine the return address for the application programming interface by detecting the application programming interface call by the self-extracting first executable.

10. The system of claim 8, wherein the instructions, when executed, cause the processor to: detect the application programming interface call by detecting system related application programming interface calls.

11. The system of claim 8, wherein the instructions, when executed, cause the processor to: detect the application programming interface call by detecting any of a predetermined set of application programming interface calls.

12. The system of claim 8, wherein the instructions, that when executed, cause the processor to: detect the application programming interface call by:
detecting allocations of memory by the self-extracting first executable; and
recording memory allocation data corresponding to the allocations of memory.

13. The system of claim 12, wherein the instructions, when executed, cause the processor to: determine whether the return address is in one of the allocations of memory based on the recorded memory allocation data.

14. The system of claim 8, wherein the instructions, when executed, cause the processor to: determine whether the fourth executable is being executed based on the return address by: compare memory contents at the return address in an active binary image with memory contents at the return address in a passive binary image.

15. The system of claim 14, wherein the instructions, that when executed, cause the processor to: determine whether the fourth executable is being executed based on the return address by translating the return address in the active binary image to an address in the passive binary image.

16. A method of unpacking a packed binary, comprising:
executing the packed binary in a programmable device to:
unpack a packed first executable of the packed binary into a second executable;
detecting an application programming interface call by the packed binary;
determining a return address for the application programming interface call; and
scanning the second executable for malware in response to the return address being in a region of memory previously allocated by the packed binary.

17. The method of claim 16, further including capturing memory allocation data upon an allocation of memory by the packed binary.

18. The method of claim 16, further including: wherein determining whether the third executable is being executed
mapping the packed binary into memory as a passive image and executing the packed binary as an active image; and
comparing memory contents at the return address in the passive image with memory contents at the return address in the active image.

19. The method of claim 18, further including translating the return address in the active image into a return address in the passive image.

* * * * *